June 7, 1966  H. A. GASS  3,254,736
AUTOMOTIVE BATTERY SECURING DEVICE
Filed Oct. 24, 1963
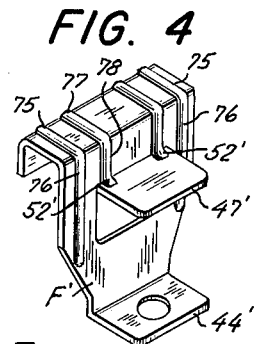
FIG. 4
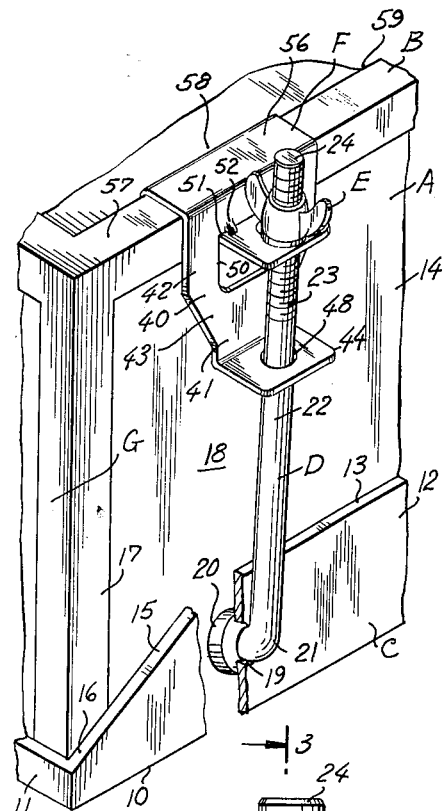
FIG. 1
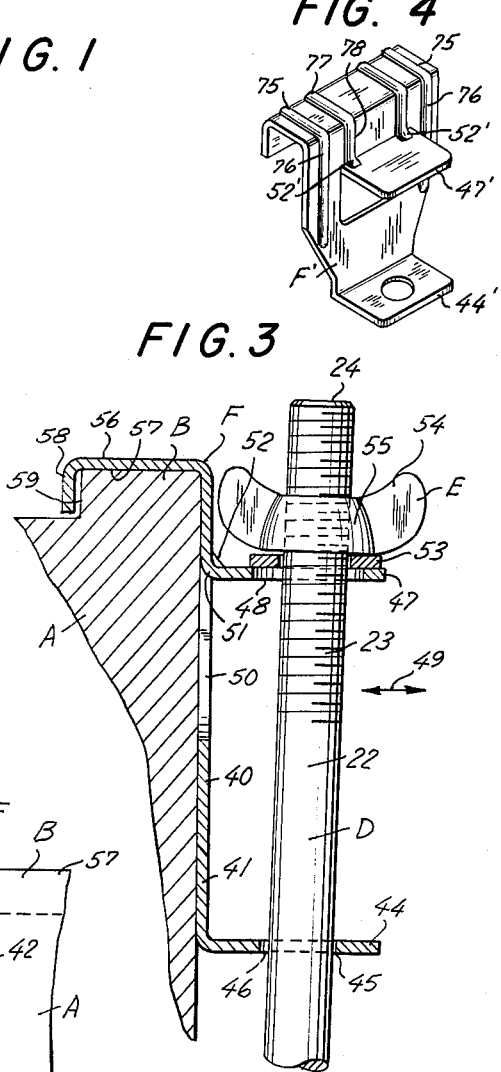
FIG. 3
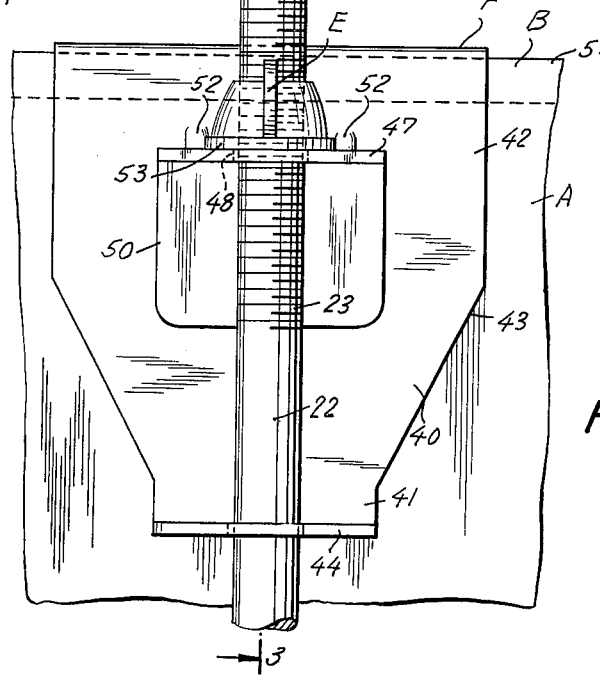
FIG. 2
INVENTOR.
HAROLD A. GASS
BY
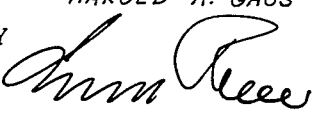
ATTORNEY

United States Patent Office 3,254,736
Patented June 7, 1966

---

3,254,736
AUTOMOTIVE BATTERY SECURING DEVICE
Harold A. Gass, New York, N.Y., assignor to Perfect Parts, Inc., Long Island City, N.Y., a corporation of New York
Filed Oct. 24, 1963, Ser. No. 318,704
10 Claims. (Cl. 180—68.5)

The present invention relates to an automotive battery securing device, and it particularly relates to a readily installed device for engaging the rim or periphery of a battery to hold it in position securely in the motor compartment of an automobile.

It is among the objects of the present invention to provide an automotive battery securing device which will securely hold the battery in the motor compartment against looseness, vibration and damage and which at the same time will permit ready removability or replacement of the battery.

Another object of the present invention is to provide a simple readily applied automotive battery securing device which will enhance the life of the battery, prevent slippage or damage thereto and which is readily attachable to a wide variety of battery sizes and shapes whether 6-volt or 12-volt.

In many automobile motor structures, there is provided a bed for holding the base of the battery, but such bed or base does not conform too closely to the battery structure and would permit a substantial displacement or change in the position of the battery during normal automotive operation.

It is, therefore, among the further objects of the present invention to provide a battery securing device which may be securely held in position by a readily attachable and detachable manual connection.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to the present invention to provide a double angle engagement member having a top inverted U-shaped clamping member to fit over and engage the rim of the battery and also a depending flange portion having outside and transversely directed engagement flanges which will function as a guide for the attachment bolt as well as a base for a clamping nut.

Normally, the bed or base support for the battery consists of a support flange having upstanding side flanges which side flanges will engage the ends of the battery adjacent the base thereof.

The attachment bolts are desirably provided so that they will engage the side flanges of the base or shelf support and extend upwardly along the sides of the battery and be threaded adjacent their upper ends.

The upper ends may receive wing nuts which will at the same time press down the flange of the battery engagement or retention device and prevent any looseness or rattling or vibration of the battery in respect to the support therefor.

One of the important features of the present invention resides in the fact that the battery retention or clamping device is integral and made of a single piece of metal which may be stamped or shaped to engage both the bolt and the top rim of the battery without the need of handling separate parts or fitting together several parts which may pull loose or be imperfectly engaged in operation.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a side perspective view of the end of the battery with the clamping device in position thereon.

FIG. 2 is a side fragmentary elevational view upon an enlarged scale as compared to FIG. 1 taken from the right of FIG. 1.

FIG. 3 is a fragmentary transverse sectional view taken upon the line 3—3 of FIG. 2.

FIG. 4 is a side perspective view of an alternative embodiment upon a reduced scale showing the application of reinforcement to the clamping device.

Referring to FIGS. 1 and 2, there is shown a battery structure A having a top lip or ridge B with a bottom holder or shelf support C forming part of the automotive structure or attached to the automotive engine.

The present invention is particularly directed to the bolt attachment D having a wing nut E which engages the battery retention device F.

The battery shelf or base support C normally will have a bottom plate 10 having the short side flanges 11 and the extended end flanges 12.

The end flanges 12 may have the transverse straight upper edges 13 which cover about one-fourth to one-third the end face 14 of the battery A with the oblique side edge portions 15 extending down to the corners 16 where they meet the short flange 11.

The battery will normally have projecting portions 17 at the corners to fit into the corner 16 of the base C and will be recessed as indicated at 18 between said corners.

The end flanges 12 are desirably provided with the openings 19 through which the body of the bolt D may be inserted.

Desirably, the bolt has an enlarged end portion 20 which is held inside of the opening 19 and secures the lower end of the bolt D in the flange 12.

Desirably, this opening may be provided closely adjacent the oblique edge 15 and to one side of the battery structure and adjacent the front side G which is closest to the hinge.

The bolt D beyond the enlarged engagement portion 20 has a right angular bent portion 21 and a vertical upwardly extending portion 22 which terminates in the upper threaded engagement portion 23.

The upper end 24 will normally extend above the top face of the top ridge B of the battery.

The present invention is particularly directed to the double flange inverted U-engagement member F which serves to engage the rim B of the battery and also the bolt D alongside of the battery A.

This flanged inverted angular retention device F has a vertical body portion 40 with the reduced width lower portion 41 and the increased width upper portion 42 which are connected by the downwardly convergent portion 43.

The lower end of the reduced width portion 41 has an outwardly and transversely projecting guide flange 44 having an opening 45 which fits about the unthreaded portion 22.

As indicated at 46, there will be a certain amount of play so that the sides of the bolts D will not frictionally engage the whole of the interior of the opening 46.

Stamped out or cut out of the upper body portion 42 will be the upper flange 47 having the same width and depth as the guide flange 44 but desirably having a larger opening 48 receiving the threaded upper portion 23 of the bolt D.

Desirably, the looseness is indicated at 46 and 48 in the flanges 44 and 47 and should permit a substantial adjustment movement of the bolt D in the direction 49 (see FIG. 3), to permit the bolt D and the retention device F to assume a final clamping position as shown in FIGS. 1 to 3.

The flange 47 as shown in FIGS. 1 to 3 will be cut out of the body or base 40 of the retention device F and the rectangular opening 50 which remains will extend across and downwardly through the lower part of the enlarged portion 42 and into the upper portion of the convergent lower section 43 of the base wall 40 of the retention device F.

Desirably, the angle 51 may be reinforced by extra metal at 52 or by pressing inwardly to form a ridge extending across the angle 51 on each side of the bolt D and on each side of the opening 48.

The threaded portion 23 of the bolt D will engage the wing nut E above the flange 47, and it may hold down or clamp the flat washer 53.

The washer 53 may be a dish shaped spring washer or it may be a flexible gasket type washer to permit a certain amount of adjustment between the flange 47 and the wing nut E.

The wing nut E desirably should have its side wings 54 project sufficiently above the conical body 55 so as to be readily accessible from above the battery structure A and be capable of being turned without interference from the retention device F.

The upper portion of the retention device F will have an inwardly directed horizontal flange 56 to fit over the top 57 of the ridge B, and it will have an interior downwardly directed flange or end portion 58 to fit against the inside face 59 of the ridge B.

The flange portions 56 and 58 will form an inverted U, and they should form a larger channel than the peripheral ridge B of the battery A so as to readily fit thereover.

If desired, internal ridges may be employed both to strengthen the flange 56 as well as to give a better footing on the top of the periphery B.

The entire bolt structure D with wing nut and retention device F may be suitably plated or coated to prevent corrosion thereof and such coating may be either a paint such as black or a plastic coating or a suitable corrosive resistant metal such as cadmium or chromium.

In operation, the bolt D will normally be inserted in the opening or slot 19 in the wall 12 and then the battery A will be pressed in position on the base C.

The retention device F will be inserted with its openings 46 and 48 on the upper portion of the bolt D and with its inverted channels 56–58, fitting over the peripheral ridge.

Then the washer 53 and wing nut E may be placed in position, and the wing nut tightened until the battery is tightly clamped down.

The bolt will automatically adjust itself to the clamp F and the battery ridge B, and when the wing nut is tightened, the battery A will be held securely down in the pan or shelf against vibration, rattling or looseness.

It will be particularly noticed that the present device is a substantially integral one-piece device which does not require fitting together of separate engagement elements, and a tight fit and clamp down of the battery will be achieved by simple tightening of the wing nut E upon the bolt D against the flange 47.

In view of the automatic adjustment of the position of the retention device F on the bolt D, there will be an automatic positioning of the structure to the height of the battery and the same device may be used for a variety of sizes and heights of batteries.

The threaded portion 23 is sufficiently long to accommodate a variety of sizes of batteries whether 6- or 12-volt.

It is thus apparent that the applicant provides a simple readily detachable and adjustable retention device which may be applied without special tools and will enable ready removability and replacement of the battery without difficulty.

To replace the battery, it is only necessary to loosen the wing nuts E and lift retention members F so that the channel 56–58 may be removed from the periphery B whereupon the still assembled bolt D, wing nut E and retention device F may be moved to the side releasing the battery A.

When the battery is positioned on the support C, the channel F may be replaced in position to engage the ridge B. Then the wing nut E may be tightened against the washer 53, and the flange 47 to clamp the new battery or replacement battery in position.

It is not necessary to disassemble the retention arrangement of the bolt D, wing nut E and retention device F to remove the battery.

To reinforce the flanges 44–47, 56–58, a series of ridges may be provided extending parallel to the side edges thereof and parallel to the bolt D and across the periphery B.

This ridge construction is diagrammatically indicated in FIG. 4 and may consist of the top ridges 75, and the side ridges 76.

There also may be two additional ridges indicated at 77 and 78 consisting of continuations of the short angle reinforcements 52.

Desirably, the metal of the engagement member F is of sufficient gauge and may have a thickness of $\frac{1}{32}$ or even $\frac{1}{16}$ of an inch so as to securely clamp the battery in position without undue flexure or bending.

In the preferred construction, the device F is formed of a hardened steel which will resist the bending movement of the bolt when the wing nut E is tightened thereon.

Sufficient play should be achieved by the washer 53 as well as the openings 46 and 48.

In FIG. 4, similarly functioning parts are indicated by the same numerals except for being primed.

As many changes could be made in the above automotive battery securing device, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A battery retention device for a storage battery structure for mounting said battery upon a flanged support structure associated with an automotive engine, said battery having an upstanding top peripheral right angular ridge and said support structure having a slotted upstanding end flange, said device including a vertical bolt having a lower inturned enlarged head received and retained in said slotted end flange and an upwardly extending vertical portion having a threaded upper end, a flanged retention member having an inverted inwardly extending U-shaped flange at the upper end thereof extending over and engaging the battery ridge and a plurality of outwardly extending transverse horizontal flanges, spaced above one another having vertically aligned openings through which said bolt extends and a wing nut engaging the upper threaded end of the bolt and pressing downwardly upon the upper flange thus clamping the U-shaped flange down upon the battery ridge, said horizontal flanges being formed integrally with the retention member and extending transversely outwardly and the upper horizontal flange being stamped integrally out of the retention member and leaving an intermediate opening therein and reinforcing ridges in said retention member extending vertically alongside the upper horizontal flange.

2. A battery retention device for a storage battery structure for mounting said battery upon a flanged support structure associated with an automotive engine, said battery having an upstanding top peripheral right angular ridge and said support structure having a slotted upstanding end flange, said device including a vertical bolt having a lower inturned enlarged head received and retained in said slotted end flange and an upwardly extending vertical portion having a threaded upper end, a flanged retention member having an inverted inwardly extending U-shaped flange at the upper end thereof extending over and engaging the battery ridge and a plurality of outwardly extending transverse horizontal flanges, spaced above one another having vertically aligned openings through which said bolt extends and a wing nut engaging the upper threaded end of the bolt and pressing downwardly upon the upper flange thus clamping the U-shaped flange down upon the battery ridge, said horizontal flanges being two and the upper flange being closely adjacent said U-shaped flange and the lower flange being positioned at the lower end of the retention member and all flanges being formed integrally with the retention member, said horizontal flanges being formed integrally with the retention member and extending transversely outwardly and the upper horizontal flange being stamped integrally out of the retention member and leaving an intermediate opening therein and reinforcing ridges in said retention member extending vertically alongside the upper horizontal flange.

3. A battery retention device for a storage battery structure for mounting said battery upon a flanged support structure associated with an automotive engine, said battery having an upstanding top peripheral right angular ridge and said support structure having a slotted upstanding end flange, said device including a vertical bolt having a lower inturned enlarged head received and retained in said slotted end flange and an upwardly extending vertical portion having a threaded upper end, a flanged retention member having an inverted inwardly extending U-shaped flange at the upper end thereof extending over and engaging the battery ridge and a plurality of outwardly extending transverse horizontal flanges, spaced above one another having vertically aligned openings through which said bolt extends and a wing nut engaging the upper threaded end of the bolt and pressing downwardly upon the upper flange thus clamping the U-shaped flange down upon the battery ridge, said retention member consisting of an enlarged width upper portion forming the inverted flange and a reduced width lower portion forming the lowermost horizontal flange and an intermediate horizontal flange stamped out of the body of the retention member and leaving an opening therein.

4. A battery retention device for a storage battery structure for mounting said battery upon a flanged support structure associated with an automotive engine, said battery having an upstanding top peripheral right angular ridge and said support structure having a slotted upstanding end flange, said device including a vertical bolt having a lower inturned enlarged head received and retained in said slotted end flange and an upwardly extending vertical portion having a threaded upper end, a flanged retention member having an inverted inwardly extending U-shaped flange at the upper end thereof extending over and engaging the battery ridge and a plurality of outwardly extending transverse horizontal flanges, spaced above one another having vertically aligned openings through which said bolt extends and a wing nut engaging the upper threaded end of the bolt and pressing downwardly upon the upper flange thus clamping the U-shaped flange down upon the battery ridge, said transverse flanges having aligned openings increasing in diameter toward the top of the retention device to receive said bolt and permit play of said bolt to adjust itself in angular position in respect to the flanges when the wing nut is tightened thereon, said horizontal flanges being formed integrally with the retention member and extending transversely outwardly and the upper horizontal flange being stamped integrally out of the retention member and leaving an intermediate opening therein and reinforcing ridges in said retention member extending vertically alongside the upper horizontal flange.

5. A battery retention device for a storage battery structure for mounting said battery upon a flanged support structure associated with an automotive engine, said battery having an upstanding top peripheral right angular ridge and said support structure having a slotted upstanding end flange, said device including a vertical bolt having a lower inturned enlarged head received and retained in said slotted end flange and an upwardly extending vertical portion having a threaded upper end, a flanged retention member having an inverted inwardly extending U-shaped flange at the upper end thereof extending over and engaging the battery ridge and a plurality of outwardly extending transverse horizontal flanges, spaced above one another having vertically aligned openings through which said bolt extends and a wing nut engaging the upper threaded end of the bolt and pressing downwardly upon the upper flange thus clamping the U-shaped flange down upon the battery ridge, said wing nut being provided with a clamping annular member between the wing nut and the upper transverse flange to take up any play between the bolt and the retention element, said horizontal flanges being formed integrally with the retention member and extending transversely outwardly and the upper horizontal flange being stamped integrally out of the retention member and leaving an intermediate opening therein and reinforcing ridges in said retention member extending vertically alongside the upper horizontal flange.

6. An integral battery holddown clamp device for association with an automotive battery to hold the battery down, said battery being of rectangular shape and having a top elevated peripheral ridge at all four upper sides thereof and having a lower metal tray support with a vertical bolt having a threaded upper end, and an inwardly extending lower end with an enlarged terminal portion, an opening in the side of the tray receiving said terminal portion and a clamping nut and washer on the threaded upper end of the bolt; said clamp device having a vertical base portion fitting against the upper side wall of the battery, and upper, middle and lower integral horizontal extensions, the upper extension extending toward the battery and over said upper ridge and the middle and lower extensions engaging the vertical bolt holding said clamp device down against the battery and the middle extension being stamped out of the base portion and integral therewith and leaving an opening therein.

7. The device of claim 6, said upper extension having a vertical portion fitting inside of the peripheral ridge and a horizontal portion clamped against the top of the ridge.

8. The clamp device of claim 6, said middle extension receiving the upper threaded end and having clamped against the top surface thereof the washer and the clamping nut and the lower horizontal extension having an opening through which the vertical bolt projects below the upper threaded portion thereof.

9. The device of claim 6, said middle and lower extensions being rectangular in shape and said upper extension having reinforcement means on each side of its center line at its junction with the vertical base portion.

10. The device of claim 6, said vertical base portion and said upper extension having reinforcing ridges extending vertically and horizontally across the same to reinforce the same.

References Cited by the Examiner

UNITED STATES PATENTS

| | | | |
|---|---|---|---|
| 1,636,562 | 7/1927 | Hick | 180—68.5 |
| 1,868,032 | 7/1932 | Thompson | 180—68.5 |
| 2,827,973 | 3/1958 | Coleman | 180—68.5 |
| 2,849,074 | 8/1958 | Key et al. | 180—68.5 |
| 2,870,855 | 1/1959 | Hildreth | 180—68.5 |
| 2,994,395 | 8/1961 | Hall | 180—68.5 |
| 3,125,177 | 3/1964 | Paller | 180—68.5 |

BENJAMIN HERSH, *Primary Examiner.*

A. HARRY LEVY, *Examiner.*

M. L. SMITH, *Assistant Examiner.*